US007142598B2

(12) United States Patent
Kim et al.

(10) Patent No.: US 7,142,598 B2
(45) Date of Patent: Nov. 28, 2006

(54) ADAPTIVE DCT/IDCT APPARATUS BASED ON ENERGY AND METHOD FOR CONTROLLING THE SAME

(75) Inventors: Dae-Won Kim, Seoul (KR); Seung-Cheol Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 518 days.

(21) Appl. No.: 10/395,616

(22) Filed: Mar. 24, 2003

(65) Prior Publication Data

US 2004/0086042 A1 May 6, 2004

(30) Foreign Application Priority Data

Nov. 4, 2002 (KR) .................. 10-2002-0067850

(51) Int. Cl.
*H04N 7/12* (2006.01)
(52) U.S. Cl. ............ 375/240; 375/240.01; 375/240.12; 375/240.2
(58) Field of Classification Search ................ 375/240, 375/240.01, 240.12, 240.2, 240.21, 240.16; 348/452; 382/239
See application file for complete search history.

(56) References Cited

U.S. PATENT DOCUMENTS

| 5,598,484 | A | 1/1997 | Suzuki et al. ................ 382/239 |
| 5,719,961 | A | 2/1998 | Normile et al. .............. 382/239 |
| 6,192,080 | B1 * | 2/2001 | Sun et al. .............. 375/240.16 |
| 6,606,126 | B1 * | 8/2003 | Lim et al. .................... 348/452 |

FOREIGN PATENT DOCUMENTS

| EP | 0 577 337 | 6/1993 |
| EP | 0 684 738 | 5/1995 |
| GB | 2 285 359 | 7/1995 |

OTHER PUBLICATIONS

JVT: "Text of Committee Draft of Joint Video Specification (ITU-T Rec. H.264 ISO/IEC 14496-10 AVC", May 2002.
Chaddha et al., "Variable Compression Using JPEG", 1994 IEEE, pp. 562-569.
Ramachandran et al., "A Fast, FPGA-Based MPEG-2 Video Encoder With A Novel Automatic Quality Control Scheme", Microprocessors and Microsystems, 25 (2002) 449-457.
Dugad et al., "A Fast Scheme for Downsampling and Unsampling in the DCT Domain", 1999 IEEE, pp. 909-913.

* cited by examiner

Primary Examiner—Allen Wong
(74) Attorney, Agent, or Firm—Dilworth & Barrese LLP (57) ABSTRACT

Adaptive DCT/IDCT apparatus based on energy and method for controlling the same. The adaptive DCT/IDCT apparatus relates to a coding unit of a MPEG4/H.263 video coder, and performs an image processing operation with a high image quality at a high speed by calculating energy values for respective blocks and a mean energy value of the whole image. The apparatus includes an energy calculator for receiving an input image, dividing the input image into blocks of predetermined size, calculating energy values for respective blocks and a mean energy value, and comparing the energy values with the mean energy value; a DCT unit for dividing the input image into predetermined blocks, and performing a DCT operation on the divided blocks; an image coefficient processor for receiving DCT coefficients for respective blocks from the DCT unit according to a result of the comparison of the block's energy value and the mean energy value, and rearranging the DCT coefficients; and an IDCT unit for receiving rearranged DCT coefficients from the image coefficient processor, performing an IDCT operation on the rearranged DCT coefficients, and creating a restored image.

8 Claims, 5 Drawing Sheets

ADAPTIVE DCT/IDCT APPARATUS BASED ON ENERGY AND METHOD FOR CONTROLLING THE SAME

PRIORITY

This application claims priority to an application entitled "ADAPTIVE DCT/IDCT APPARATUS BASED ON ENERGY AND METHOD FOR CONTROLLING THE SAME", filed in the Korean Intellectual Property Office on Nov. 4, 2002 and assigned Ser. No. 2002-67850, the contents of which are hereby incorporated by reference herein.

BACKGROUND OF THE INVENTION

1. Field of the Invention

The present invention relates to a coding unit for a MPEG4/H.263 video coder, and more particularly to an adaptive DCT/IDCT (Discrete Cosine Transform/Inverse Discrete Cosine Transform) apparatus based on energy, for processing DCT and IDCT operations with a high image quality at a high speed by calculating energy of an input image in block units, and a method for controlling the same.

2. Description of the Related Art

A mobile communication service began with the first-generation analog service, and has gradually developed from the second-generation digital communication service to the third-generation IMT-2000 service. The IMT-2000 service is a communication service for enabling the next generation mobile communication terminal using standard technology proposed by ITU-T (International Telecommunications Union—Telecommunication). The IMT-2000 service enables users to receive a variety of services such as a voice phone service, a telex service, a pager service, and an E-mail service, etc., anywhere in the whole world. Current mobile communication services such as a cellular or PCS phone service for mainly providing users with voice services are being developed for the IMT-2000 service for supporting multimedia personal communications such as high-speed data, packets or images.

The IMT-2000 mobile terminal provides users with global broadband roaming service at a high speed, displays moving images on its own screen with a VOD (Video On Demand) scheme, and enables the users to exchange their images via a camera mounted to the terminal.

Therefore, the IMT-2000 terminal is of importance to a multimedia application service processor rather than a modem function. So, a chip and an additional memory for processing the multimedia application service besides a modem chip are needed to implement a wireless video mobile communication service with an optimal amount of processing capacity and a minimum amount of errors.

The development of the compression technology for storing/transmitting the large amount of data and standardization thereof are needed to implement the aforementioned audio and moving image services. The digital image technology has been developed from still images to moving images, and therefore the fundamental basis for multimedia services has been established.

In the meantime, the MPEG (Moving Picture Experts Groups) standardization has started to compression-store the moving images in a storage media.

There have been proposed a variety of established standardizations such as a H.261 recommended by the ITU, an MPEG-1, a MPEG-2, and a H.263 recommend by the ITU. The H.261 is used for a video telephone or video conference service with a transfer rate of 64 kbps~2 Mbps. The MPEG-1 is used for a digital storage medium with a transfer rate of about 1.5 Mbps. The MPEG-2 is applicable to a digital TV or HDTV with a transfer rate of 3 Mbps~15 Mbps. The H.263 is adapted as a short-term standardization for applications with very low transfer rates less than 64 kbps.

In more detail, the H.263 uses almost the same method as a mixed method of a motion compensation and a DCT used as a moving image compression method of the H.261, MPEG-1, or MPEG-2. It therefore has disadvantages in that a blocking phenomenon is caused in case of highly compressing images in the conventional H.261, MPEG-1, or MPEG-2 system and an image quality of a reproduced image is abruptly degraded.

A video coding method for displaying MPEG-4/H.263-format moving images on an LCD screen of an IMT-2000 terminal performs a coding or encoding operation using a DCT with 8×8-sized image blocks and performs a decoding operation using an IDCT. In this case, the decoding operation is performed using the whole 8×8-sized frequency coefficient block. In this manner, provided that such an IDCT is performed using the whole 8×8-sized frequency coefficient block, a clearly reproduced image can be obtained.

However, in the case where the IDCT is performed using the whole 8×8-sized frequency coefficient block and then a decoding operation is performed, too many calculations are needed and high computational complexity results even though the resulting reproduced image has high quality, such that the above conventional video coding method unavoidably requires both a large amount of memory and a long processing time.

SUMMARY OF THE INVENTION

Therefore, the present invention has been made in view of the above problems, and it is an object of the present invention to provide an adaptive DCT/IDCT apparatus and method for calculating energy by dividing an image into predetermined blocks, performing a DCT on 8×8 blocks of the image, comparing mean energy of the whole image with energy for every block, adaptively selecting only a DCT coefficient corresponding to one of 1×1, 3×3 and 4×4 blocks on the basis of the upper left end of the image blocks upon receiving the compared result, making the remaining DCT coefficients equal to zero, and performing a decoding operation to establish image restoration.

It is another object of the present invention to provide an adaptive DCT/IDCT apparatus which includes an energy calculator for dividing an input image into predetermined blocks and calculating an energy value for each block, a DCT unit for performing a DCT in 8×8-block units upon receiving the input image, an image coefficient processor for adaptively processing DCT coefficients according to the energy value for each for 8×8—block unit, and an IDCT unit for performing an IDCT using frequency coefficients reconstructed by the image coefficient processor and establishing image restoration, in such a way that the adaptive DCT/IDCT apparatus performs adaptive DCT/IDCT operations according to energy of the input image in case of coding MPEG4/H.263-format moving images.

In accordance with one aspect of the present invention, the above and other objects can be accomplished by the provision of an adaptive DCT/IDCT (Discrete Cosine Transform/Inverse Discrete Cosine Transform) apparatus based on energy in a coding unit of a MPEG4/H.263 video coder, the apparatus comprising: an energy calculator for receiving an input image, dividing the input image into blocks of predetermined size, calculating energy values for respective blocks and a mean energy value for the input image, and comparing the energy values of the blocks with the mean energy value; a DCT unit for dividing the input image into blocks corresponding to the blocks of the energy calculator, and performing a DCT operation on the divided blocks; an image coefficient processor for receiving DCT coefficients for respective blocks from the DCT unit according to a result of the comparison of the block's energy value and the mean energy value, and recasting the DCT coefficients; and an IDCT unit for receiving recasted DCT coefficients from the image coefficient processor, performing an IDCT operation on the recast DCT coefficients, and creating a restored image.

In accordance with another aspect of the present invention, there is provided an adaptive DCT/IDCT method based on energy in case of performing an image processing operation at a coding unit of a MPEG4/H.263 video coder, the method comprising the steps of: a) receiving an image; b) dividing the image into predetermined blocks, and calculating energy values for the blocks; c) calculating a mean energy value of the image; d) upon receiving the image, performing a DCT operation in the predetermined block units, calculating DCT coefficients, and storing the calculated DCT coefficients; e) comparing the energy values for respective blocks with the mean energy value; f) receiving DCT coefficients for corresponding blocks and recasting the DCT coefficients according to a result of the comparison of the step (e); and g) performing an IDCT operation on the recast DCT coefficients, and creating a restored image.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when they are well-known in the art.

Figure 1:
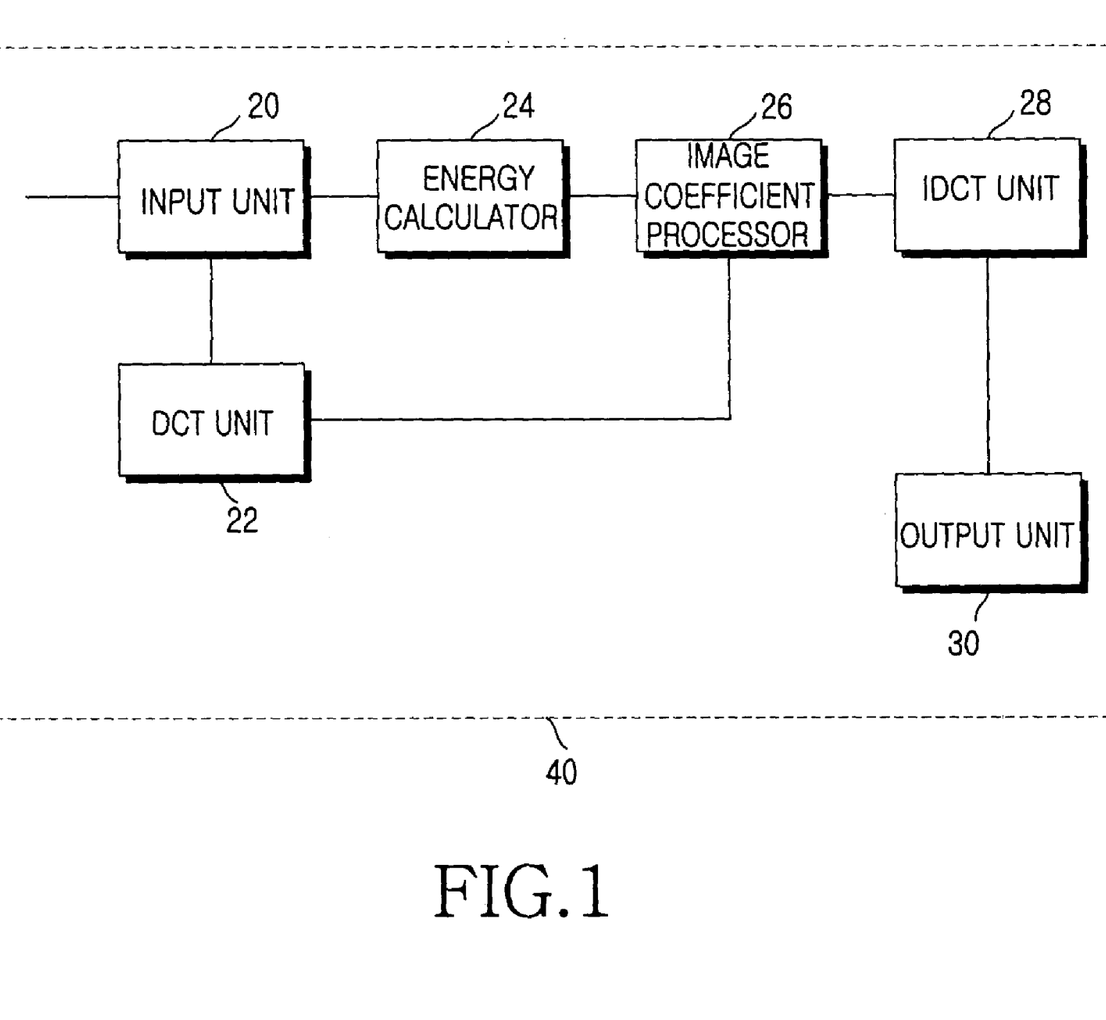
FIG. 1 is a view illustrating a block diagram of a coding unit of a MPEG4 or H.263 video coder in accordance with a preferred embodiment of the present invention.

FIG. 1 is a view illustrating a block diagram of a coding unit 40 of a MPEG4 video coder or a H.263 video coder in accordance with a preferred embodiment of the present invention.

Referring to FIG. 1, an input unit 20 receives an image, an energy calculator 24 receives the image from the input unit 20, divides it into blocks of predetermined size, calculates an energy value for each block, and calculates a mean energy value of the whole image, and compares the mean energy value with the energy value of each block. A DCT unit 22 also divides the input image into blocks of the predetermined size, and performs a coding operation by performing a DCT operation on the blocks. An image coefficient processor 26 receives a result of the comparison of the mean energy value and the energy value of each block from the energy calculator 24, receives DCT coefficients for the blocks of predetermined size from the DCT unit 22. Image coefficient processor 26 performs rearrangement of the DCT coefficients for each block based on the corresponding energy value of the block. An IDCT unit 28 performs an IDCT using the DCT coefficients rearranged by the image coefficient processor 26, and performs a decoding operation to create a restored image. An output unit 30 outputs the restored image received from the IDCT unit 28.

In this manner, the present invention obtains energy for each block of the input image, calculates total mean energy of the input image, and reconstructs an image with a partial DCT coefficient generated from the DCT unit 22 upon receiving the energy for each block and the total mean energy in such a way that it establishes image restoration.

In the meantime, a mathematical equation for obtaining energy values processed in the energy calculator 24 in association with the input image is represented as the following Equation 1:

$$P_{MB} = \frac{1}{R^2} \sum_{x=0}^{R-1} \sum_{y=0}^{R-1} S \log S \qquad \text{[Eq. 1]}$$

where $P_{MB}$ is an energy value of the image, S is $|f(x,y)-E(f)|$, $f(x,y)$ is a pixel value of the image, $E(f)$ is a mean value of image pixels, and R is a size of the image block.

The mean value, $E(f)$ of a 8×8 sized image block is defined as $$E(f) = \frac{1}{R^2} \sum_{x=0}^{R-1} \sum_{y=0}^{R-1} f(x, y)$$

Eq. 1 is used for computing the energy value of each blocks (8×8 sized) in a whole image. In other words, PMB is the energy value of a 8×8 sized image block in a whole image. In order to calculate the mean energy value, $P_{MB\_mean}$, of all 8×8 sized image blocks in the whole image, $$P_{MB\_mean} = \frac{1}{(Q/R)^2} \sum_{x=0}^{Q/R-1} \sum_{y=0}^{Q/R-1} P_{MB}(x, y)$$

where, Q=Size of a whole image

R=8, the size of an image block x, y=Indices for horizontal and vertical axes respectively $P_{MB}(x, y)$=The energy of an image block at (x, y) index position in the whole image.

Also, a mathematical equation for dividing the input image received from the DCT unit 22 into predetermined blocks, performing a DCT on the blocks, and performing a coding operation at the energy calculator 24 is represented as the following Equation 2:

$$F(u, v) = \frac{2}{N} C(u)C(v) \sum_{x=0}^{N-1} \sum_{y=0}^{N-1} f(x, y) \cos\frac{(2x+1)u\pi}{2N} \cos\frac{(2y+1)v\pi}{2N} \quad [\text{Eq. 2}]$$

where u,v,x,y=0,1,2, . . . N−1 (where N is the size of an image block, that is, 8), x, y are horizontal and vertical axes, respectively (where the horizontal axis corresponds to the column index and the vertical axis corresponds to the row index of the image square of eight rows and eight columns), u, v are axes of a transform domain, and $$C(u), C(v) = \begin{pmatrix} \frac{1}{\sqrt{2}} & u, v = 0 \\ 1 & \text{other cases} \end{pmatrix}.$$

Further, a mathematical equation for performing an IDCT in the IDCT unit 28 and performing a decoding operation therein is represented as the following Equation 3:

$$f(x, y) = \frac{2}{N} \sum_{x=0}^{N-1} \sum_{y=0}^{N-1} C(u)C(v)F(u, v) \cos\frac{(2x+1)u\pi}{2N} \cos\frac{(2y+1)v\pi}{2N} \quad [\text{Eq. 3}]$$

Figure 2:
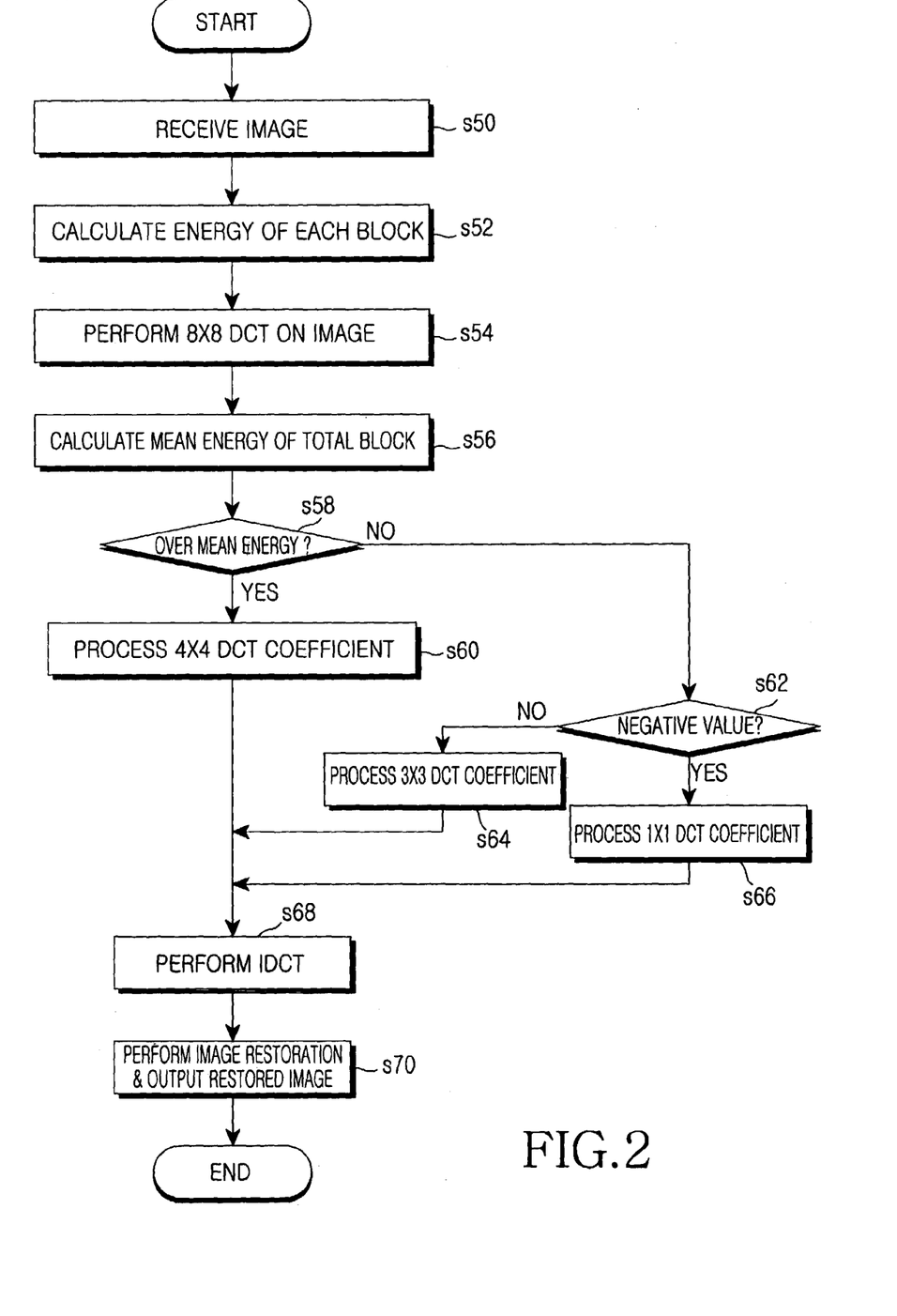
FIG. 2 is a flow chart illustrating an adaptive DCT/IDCT procedure based on energy in accordance with a preferred embodiment of the present invention.

FIG. 2 is a flow chart illustrating a method for adaptively processing an input image on the basis of energy at the coding unit 40 of the MPEG4/H.263 video coder shown in FIG. 1 in accordance with a preferred embodiment of the present invention.

Referring to FIG. 2, if the input unit 20 receives an input image at step S50, the energy calculator 24 sets up an 8×8-block on the upper left end of the input image, and calculates an energy value as shown in the Equation 1. A plurality of the 8×8-blocks may be provided according to a size of the image, and the energy calculator 24 calculates an energy value of each 8×8 block at step S52.

The DCT unit 22 performs a DCT on an 8×8-block positioned at the upper left end of the input image using the Equation 2, performs a coding operation on the DCT-processed 8×8-block, and stores DCT coefficients. In the same manner as the energy calculator 24, the DCT unit 22 divides the whole image into 8×8 blocks, performs a DCT on the blocks, and calculates a DCT coefficient for each block at step S54.

The energy calculator 24 calculates a mean energy value of the whole image at step S56 to compare the mean energy value with an energy value for each 8×8 block.

The energy calculator 24 compares the mean energy value of the whole image with the energy value for each 8×8 block, and separately classifies 8×8 blocks each having energy more than the mean energy value and other 8×8 blocks each having energy less than the mean energy value at step S58.

In the case where an 8×8 block's energy is higher than the mean energy value at step S58 as determined for a particular block by energy calculator 24, the image coefficient processor 26 selects a DCT coefficient corresponding to a 4×4-sized block on the basis of the upper left end of the 8×8 block received from the DCT unit 22 corresponding to the particular block, and makes the remaining coefficients equal zero. That is, the image coefficient processor 26 receives only a DCT coefficient corresponding to a 4×4-block positioned at a corresponding block's upper left end, and makes DCT coefficients of the remaining blocks equal zero at step S60.

In the case where the 8×8 block's energy is a positive value (+) but less than the mean energy value at step S62, the image coefficient processor 26 selects a DCT coefficient corresponding to a 3×3-sized block on the basis of the upper left end of the 8×8 block, and makes the remaining coefficients other then the selected one equal zero. That is, the image coefficient processor 26 receives only a DCT coefficient corresponding to a 3×3-block positioned at a corresponding block's upper left end, and makes DCT coefficients of the remaining blocks equal zero at step S64.

In the case where the 8×8 block's energy is a negative value (−) because of the characteristics of a logarithmic function at step S52, the image coefficient processor 26 selects a DCT coefficient corresponding to a 1×1-sized block on the basis of the upper left end of the 8×8 block, and makes the remaining coefficients equal zero. That is, the image coefficient processor 26 receives only a DCT coefficient corresponding to a 1×1-block positioned at a corresponding block's upper left end, and makes DCT coefficients of the remaining blocks equal zero at step S66.

The IDCT unit 28 performs an IDCT shown in the above Equation 3 at step S68 upon receiving a DCT coefficient reconstructed by the above comparing result of the mean energy value of the whole image and the energy value of each block, such that it obtains a newly restored image and transmits it to the output unit 30 at step S70.

As described above, the present invention divides an input image into 8×8 blocks, and calculates an energy value for each block. Also, the present invention divides the input image into 8×8 blocks, calculates a DCT coefficient of each block, and compares mean energy of a whole image with energy of each 8×8 block. In this case, an image restoration is performed with a 4×4 DCT coefficient when the 8×8 block's energy is higher than the mean energy, is performed with a 3×3 DCT coefficient when the 8×8 block's energy is a positive value but less than the mean energy, or is performed with a 1×1 DCT coefficient when the 8×8 block's energy is a negative value (−). Then, an IDCT operation is performed to form a new image.

Figure 3:
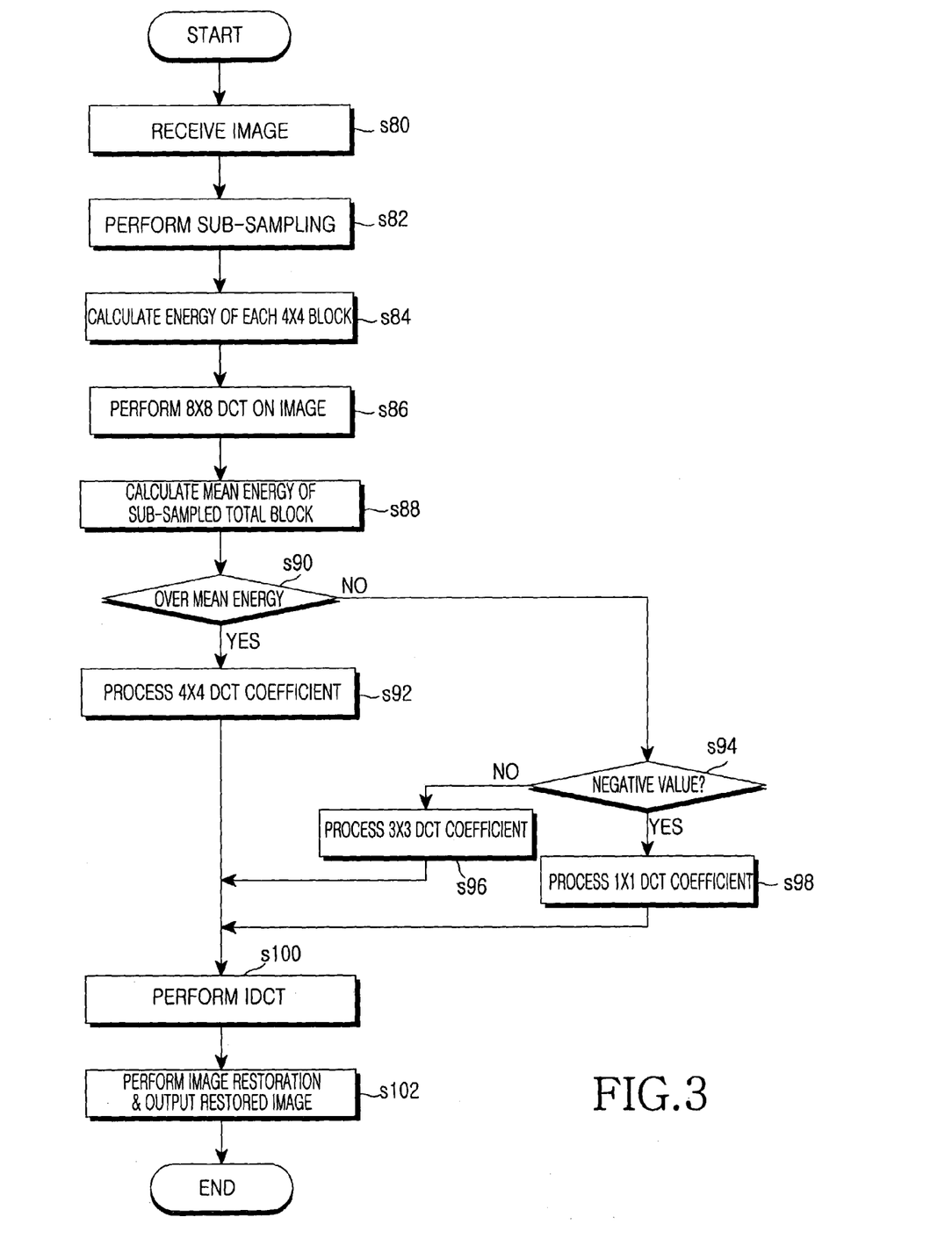
FIG. 3 is a flow chart illustrating an adaptive DCT/IDCT procedure based on energy in accordance with another preferred embodiment of the present invention.

FIG. 3 is a flow chart illustrating a method for adaptively processing an input image on the basis of energy at the coding unit 40 of the MPEG4/H.263 video coder shown in FIG. 1 in accordance with another preferred embodiment of the present invention.

Referring to FIG. 3, if the input unit 20 receives an input image at step S80, the energy calculator 24 performs a sub-sampling operation at step S82 to reduce the size of the input image by half.

The energy calculator 24 sets up a 4×4-block on the upper left end of a half-sized image, and calculates an energy value as shown in the Equation 1. A plurality of the 4×4-blocks may be provided according to the size of the image, and the energy calculator 24 calculates an energy value of each 4×4 block at step S84.

The DCT unit 22 performs a DCT on an 8×8-block positioned at the upper left end of the original input image using the Equation 2, performs a coding operation on the DCT-processed 8×8-block, and stores DCT coefficients. That is, the DCT unit 22 divides the whole image into 8×8 blocks, performs a DCT on the divided blocks, and calculates a DCT coefficient for each block at step S86.

The energy calculator 24 calculates a mean energy value of the sub-sampled image at step S88 to compare the mean energy value with the energy value for each 4×4 block. (Thus, the sub-sampled 4×4 blocks correspond to the 8×8 blocks in the DCT unit.)

The energy calculator 24 compares the mean energy value of the whole image with the energy value for each 4×4 block, and discriminates between 4×4 blocks each having energy more than the mean energy value and other 4×4 blocks each having energy less than the mean energy value at step S90.

In the case where the 4×4 block's energy is higher than the mean energy value at step S90, the image coefficient processor 26 selects a DCT coefficient corresponding to a 4×4-sized block on the basis of the upper left end of the 8×8 block, and makes the remaining coefficients equal zero. That is, the image coefficient processor 26 receives only a DCT coefficient corresponding to a 4×4-block positioned at a corresponding block's upper left end, and makes DCT coefficients of the remaining blocks equal zero at step S92.

In the case where the 4×4 block's energy is a positive value (+) but less than the mean energy value at step S94, the image coefficient processor 26 selects a DCT coefficient corresponding to a 3×3-sized block on the basis of the upper left end of the 8×8 block, and makes the remaining coefficients equal zero. That is, the image coefficient processor 26 receives only a DCT coefficient corresponding to a 3×3-block positioned at a corresponding block's upper left end, and makes DCT coefficients of the remaining blocks equal zero at step S96.

In the case where the 4×4 block's energy is a negative value (−) because of the characteristics of a logarithmic function at step S84, the image coefficient processor 26 selects a DCT coefficient corresponding to a 1×1-sized block on the basis of the upper left end of the 8×8 block, and makes the remaining coefficients equal zero at step S98. That is, the image coefficient processor 26 receives only a DCT coefficient corresponding to a 1×1-block positioned at a corresponding block's upper left end, and makes DCT coefficients of the remaining blocks equal zero at step S98.

The IDCT unit 28 performs an IDCT shown in the above Equation 3 at step S100 upon receiving a DCT coefficient reconstructed by the above comparing result of the mean energy value of the sub-sampled image and the energy value of each block, such that it obtains a newly restored image and transmits it to the output unit 30 at step S102.

As described above, the present invention performs a sub-sampling operation to reduce the size of the input image by half, divides the input image into 4×4 blocks, and calculates an energy value for each block. Also, the present invention divides the original input image into 8×8 blocks, calculates a DCT coefficient of each block, and compares mean energy of a half-sized image with energy of each 4×4 block. In this case, an image restoration is performed with a 4×4 DCT coefficient when the 4×4 block's energy is higher than the mean energy, is performed with a 3×3 DCT coefficient when the 4×4 block's energy is positive but less than the mean energy, or is performed with a 1×1 DCT coefficient when the 4×4 block's energy is a negative value (−). Then, an IDCT operation is performed to form a new image.

The method shown in FIG. 3 makes a coding or decoding speed faster because it performs a sub-sampling operation for reducing the size of the input image by half.

Figure 4:
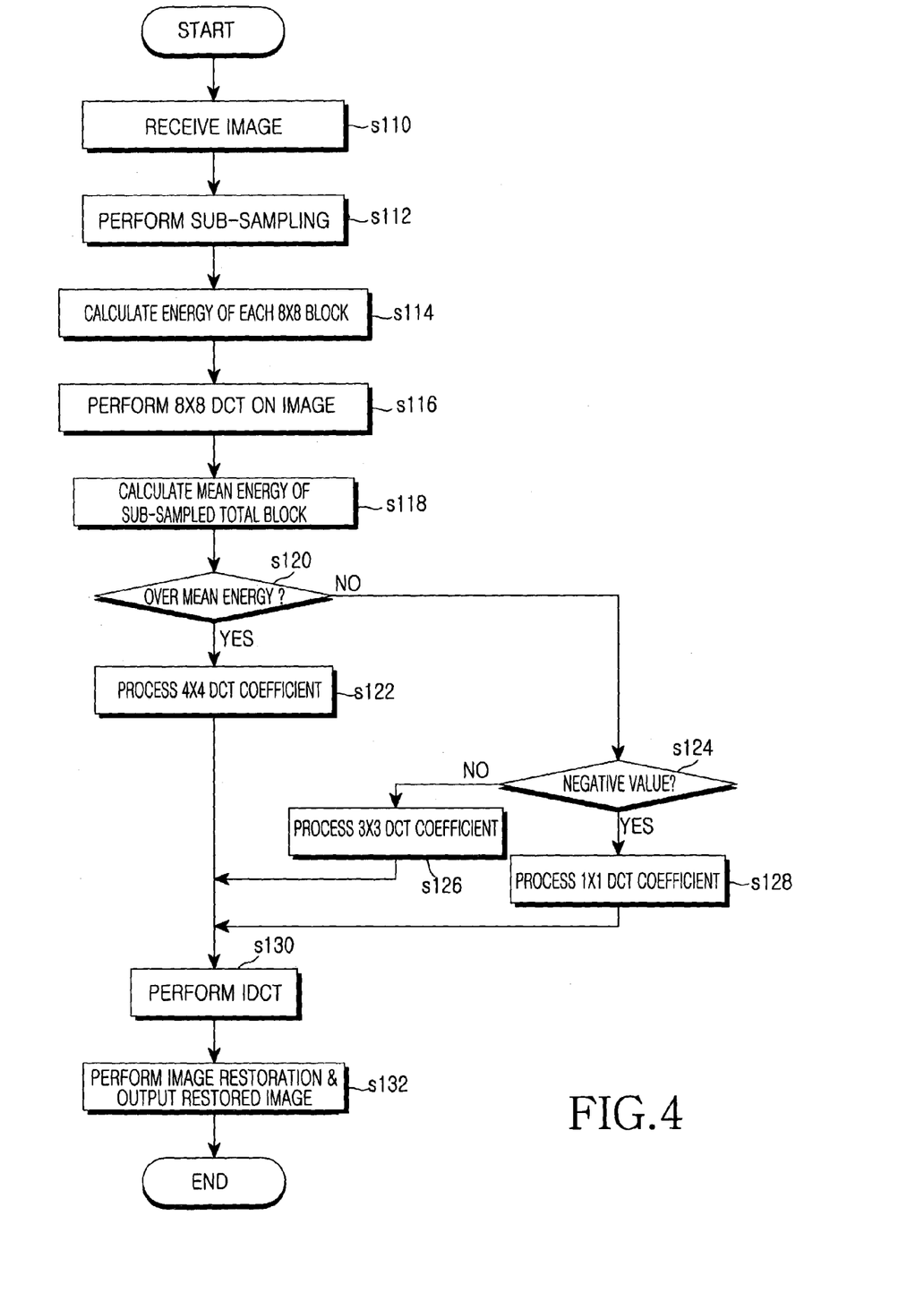
FIG. 4 is a flow chart illustrating an adaptive DCT/IDCT procedure based on energy in accordance with a still another preferred embodiment of the present invention.

FIG. 4 is a flow chart illustrating a method for adaptively processing an input image on the basis of energy at the coding unit 40 of the MPEG4/H.263 video coder shown in FIG. 1 in accordance with a still another preferred embodiment of the present invention.

Referring to FIG. 4, if the input unit 20 receives an input image at step S110, the energy calculator 24 performs a sub-sampling operation at step S112 to reduce the size of the input image by half.

The energy calculator 24 sets up an 8×8-block on the upper left end of a half-sized image, and calculates an energy value as shown in the Equation 1. A plurality of the 8×8-blocks may be provided according to the size of the image, and the energy calculator 24 calculates an energy value of each 8×8 block at step S114.

The DCT unit 22 performs a DCT on an 8×8-block positioned at the upper left end of the original input image using the Equation 2, performs a coding operation on the DCT-processed 8×8-block, and stores DCT coefficients. That is, the DCT unit 22 divides the whole image into 8×8 blocks, performs a DCT on the divided blocks, and calculates a DCT coefficient for each block at step S116.

The energy calculator 24 calculates a mean energy value of the sub-sampled image at step S118 to compare the mean energy value with the energy value for each 8×8 block. In this case, the mean energy value is obtained on condition that the energy values of every block are all added and the added result is divided by the number of blocks at step S118.

The energy calculator 24 compares the mean energy value of the sub-sampled image with the energy value for each 8×8 block, and discriminates between 8×8 blocks each having energy more than the mean energy value and other 8×8 blocks each having energy less than the mean energy value at step S120.

In the case where the 8×8 block's energy is higher than the mean energy value at step S120, the image coefficient processor 26 selects a DCT coefficient corresponding to a 4×4-sized block on the basis of the upper left end of the 8×8 block, and makes the remaining coefficients equal zero. That is, the image coefficient processor 26 receives only a DCT coefficient corresponding to a 4×4-block positioned at a corresponding block's upper left end, and makes DCT coefficients of the remaining blocks equal zero at step S122.

In the case where the 8×8 block's energy is a positive value (+) but less than the mean energy value at step S124, the image coefficient processor 26 selects a DCT coefficient corresponding to a 3×3-sized block on the basis of the upper left end of the 8×8 block, and makes the remaining coefficients equal zero at step S126.

In the case where the 8×8 block's energy is a negative value (−) because of the characteristics of a logarithmic function at step S114, the image coefficient processor 26 selects a DCT coefficient corresponding to a 1×1-sized block on the basis of the upper left end of the 8×8 block, and makes the remaining coefficients equal zero. That is, the image coefficient processor 26 receives only a DCT coefficient corresponding to a 1×1-block positioned at a corresponding block's upper left end, and makes DCT coefficients of the remaining blocks equal zero at step S128.

The IDCT unit 28 performs an IDCT shown in the above Equation 3 at step S130 upon receiving a DCT coefficient reconstructed by the above comparing result of the mean energy value of the sub-sampled image and the energy value of each block, such that it obtains a newly restored image and transmits it to the output unit 30 at step S132.

As described above, the present invention performs a sub-sampling operation to reduce the size of the input image by half, divides the input image into 8×8 blocks, and calculates an energy value for each block. Also, the present invention divides the original input image into 8×8 blocks, calculates a DCT coefficient of each block, and compares mean energy of a half-sized image with energy of each 8×8 block. In this case, an image restoration is performed with a 4×4 DCT coefficient when the 8×8 block's energy is higher than the mean energy, is performed with a 3×3 DCT coefficient when the 8×8 block's energy is positive but less than the mean energy, or is performed with a 1×1 DCT coefficient when the 8×8 block's energy is a negative value (−). Then, an IDCT operation is performed to form a new image.

Figure 5:
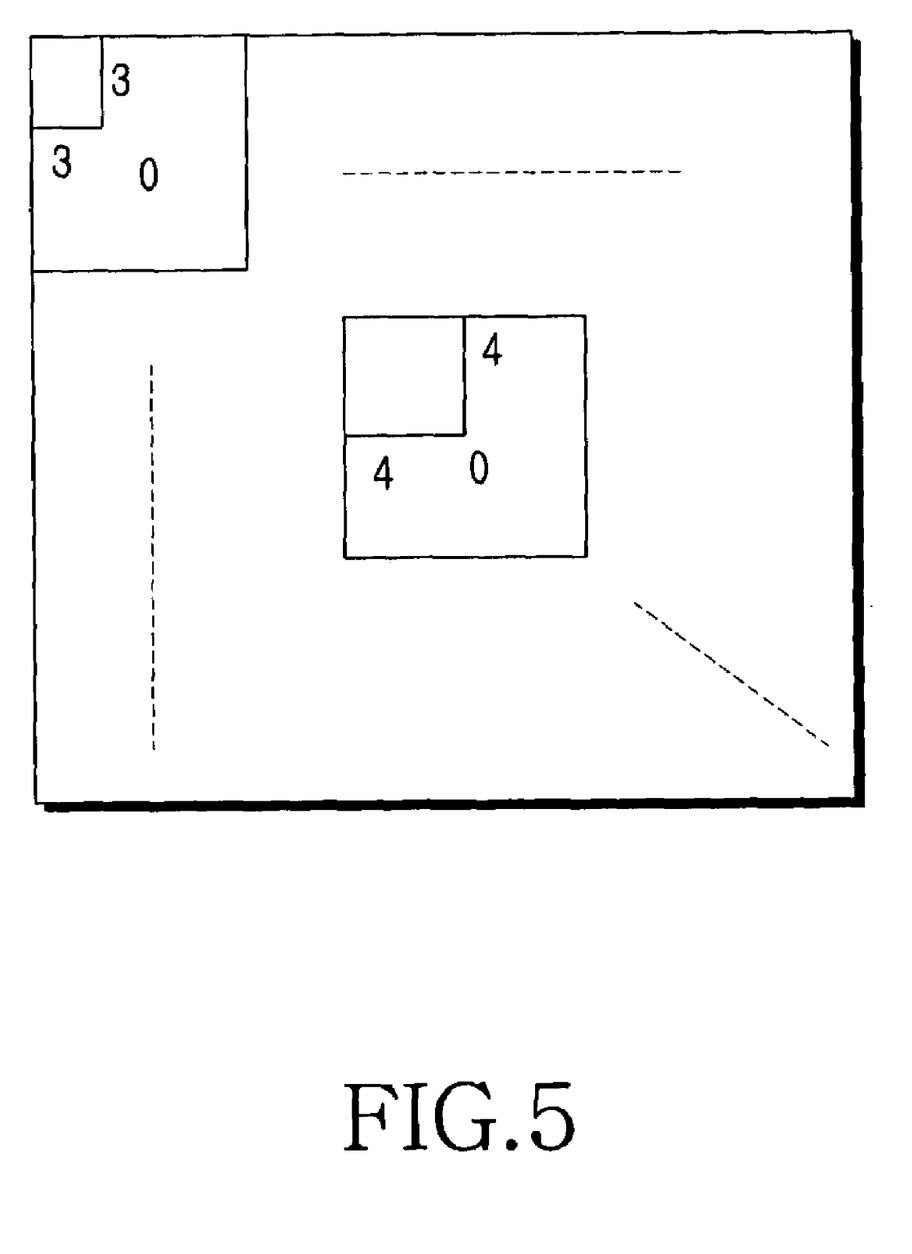
FIG. 5 is a view illustrating structural rearrangement of DCT coefficients according to energy values in accordance with the present invention.

FIG. 5 is a view illustrating structural rearrangement of DCT coefficients according to energy values in accordance with the present invention. As shown in FIG. 5, in case of performing an image restoration, a 4×4 DCT coefficient is used and DCT coefficients of the remaining pixels equal zero when an energy value of each block is higher than the mean energy value on the basis of the upper left end of 8×8 blocks, a 3×3 DCT coefficient is used and DCT coefficients of the remaining pixels equal zero when an energy value of each block is positive but less than the mean energy value, or a 1×1 DCT coefficient is used (comprised of the scalar value of the first column of the first row of each 8×8 DCT block) and DCT coefficients of the remaining pixels equal zero when an energy value of each block is a negative value (−).

The present invention divides an input image into blocks, and calculates an energy value for each block. Also, the present invention divides the input image into blocks, calculates a DCT coefficient of each block, and compares mean energy of a whole image with energy of each block. In this case, an image restoration is performed with one of 4×4, 3×3 and 1×1 DCT coefficients on the basis of 8×8 blocks upon receiving the comparing result of the mean energy of the whole image and the energy of each block, and the remaining DCT coefficients equal zero. Then, an IDCT operation is performed to form a newly restored image.

As apparent from the above description, the present invention considerably reduces the level of computational complexity and the number of calculations needed to perform an image processing operation in comparison with the conventional art. Therefore, the present invention can be implemented with less memory at a high speed, provides a wireless mobile terminal with excellent image quality, reduces the cost of production, and is able to add additional functions to the terminal.

Also, the present invention performs an IDCT by adaptively using only one of 1×1, 3×3 and 4×4—sized DCT coefficients according to a result of the comparison of a mean energy value of an input image and an energy value for each block, in such a way that it creates a restored image. Therefore, the present invention obtains an excellent result in the light of a PSNR (Peak Signal Noise Ratio), and greatly reduces the amount of memories and the length of a processing time, thereby increasing system efficiency.

Further, the present invention is applicable to a wireless mobile communication field within a narrow band of an IMT-2000 terminal, and is effectively useful to a moving image transmission service or a wireless video phone service.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An adaptive DCT/IDCT (Discrete Cosine Transform/Inverse Discrete Cosine Transform) apparatus based on energy in a coding unit of a MPEG4/H.263 video coder, said apparatus comprising:
an energy calculator for receiving an input image, dividing the input image into blocks of predetermined size, calculating energy values for respective blocks and a mean energy value for the input image using the following equation $$P_{MB} = \frac{1}{R^2} \sum_{x=0}^{R-1} \sum_{y=0}^{R-1} S \log S$$

where $P_{MB}$ is an energy value of the image, $S$ is $|f(x,y)-E(f)|$, $f(x,y)$ is a pixel value of the image, $E(f)$ is a mean value of image pixels, and $R$ is a size of the image, and comparing the energy values of the blocks with the mean energy value;
a DCT unit for dividing the input image into blocks corresponding to the blocks of the energy calculator, and performing a DCT operation on the divided blocks;
an image coefficient processor for receiving DCT coefficients for respective blocks from the DCT unit according to a result of the comparison of the block's energy value and the mean energy value, and recasting the DCT coefficients; and
an IDCT unit for receiving recasted DCT coefficients from the image coefficient processor, performing an IDCT operation on the recast DCT coefficients, and creating a restored image.

2. The apparatus as set forth in claim 1, wherein the energy calculator performs a sub-sampling operation on an input image to reduce a size of the input image by half.

3. An adaptive DCT/IDCT method based on energy in case of performing an image processing operation at a coding unit of a MPEG4/H.263 video coder, said method comprising the steps of:
a) receiving an image;
b) dividing the image into predetermined blocks, and calculating energy values for the blocks;
c) calculating a mean energy value of the image;
d) upon receiving the image, performing a DCT operation in the predetermined block units, calculating DCT coefficients, and storing the calculated DCT coefficients;
e) comparing the energy values for respective blocks with the mean energy value;
f) receiving DCT coefficients for corresponding blocks, and recasting the DCT coefficients according to a result of the comparison of the step (e, which includes:
if the block energy value is higher than the mean energy value, receiving only a 4×4 DCT coefficient positioned at the upper left end on the basis of a 8×8 size, and making DCT coefficients of the remaining pixels equal zero,
if the block energy value is a positive value but less than the mean energy value, receiving only a 3×3 DCT coefficient positioned at the upper left end on the basis of a 8×8 size, and making DCT coefficients of the remaining pixels equal zero, and
if the block energy value is a negative value, receiving only a 1×1 DCT coefficient positioned at the upper left end on the basis of a 8×8 size, and making DCT coefficients of the remaining pixels equal zero; and g) performing an DCT operation on the recast DCT coefficients, and creating a restored image.

4. The method as set forth in claim 3, wherein the step (b) includes the steps of:

dividing the image into 8×8 blocks, and performing an image processing operation in units of 8×8 blocks.

5. The method as set forth in claim 3, wherein the step of performing a DCT operation on the image in the predetermined block units, calculating DCT coefficients, and storing the calculated DCT coefficients includes the steps of:

dividing the image into 8×8 blocks, and calculating the DCT coefficients.

6. An adaptive DCT/IDCT method based on energy in case of performing an image processing operation at a coding unit of a MPEG4/H.263 video coder, said method comprising the steps of:

a) receiving an image;

b) performing a sub-sampling operation on the image to reduce a size of the image by half;

c) dividing the sub-sampled image into predetermined blocks, and calculating energy values for the blocks;

d) calculating a mean energy value of the sub-sampled image;

e) upon receiving the image, performing a DCT operation in block units of the whole image, the block units corresponding to the predetermined blocks, calculating DCT coefficients, and storing the calculated DCT coefficients;

f) comparing the energy values for respective blocks with the mean energy value;

g) receiving DCT coefficients for corresponding blocks, and recasting the DCT coefficients according to a result of the comparison of the step (f), which includes:

if the block energy value is higher than the mean energy value, receiving only a 4×4 DCT coefficient positioned at the upper left end on the basis of a 8×8 size, and making DCT coefficients of the remaining pixels equal zero, if the block energy value is a positive value but less than the mean energy value, receiving only a 3×3 DCT coefficient positioned at the upper left end on the basis of a 8×8 size, and making DCT coefficients of the remaining pixels equal zero, and if the block energy value is a negative value, receiving only a 1×1 DCT coefficient positioned at the upper left end on the basis of a 8×8 size, and making DCT coefficients of the remaining pixels equal zero; and h) performing an LDCT operation on the recast DCT coefficients, and creating a restored image.

7. The method as set forth in claim 6, wherein the step (c) divides the image into 4×4 or 8×8 blocks, and calculates energy values in units of the 4×4 or 8×8 blocks.

8. The method as set forth in claim 6, wherein the step of performing a DCT operation on the image in the predetermined block units, calculating DCT coefficients, and storing the calculated DCT coefficients includes the steps of:

dividing the image into 8×8 blocks, and calculating the DCT coefficients.

* * * * *